Oct. 20, 1942.   A. B. NEWTON   2,299,404
AUTOMATICALLY OPERATED VALVE
Filed Oct. 28, 1939
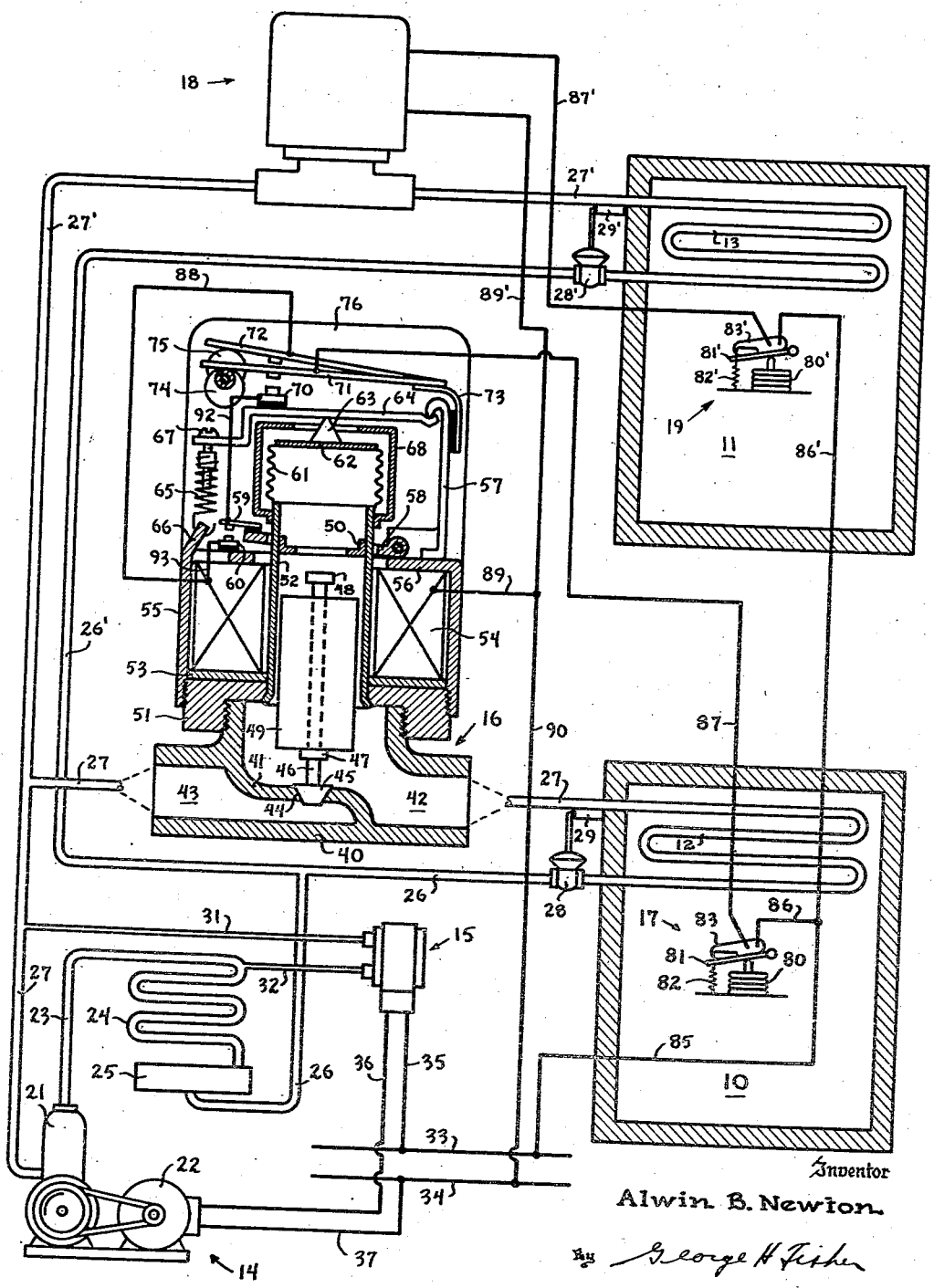
Inventor
Alwin B. Newton
By George H. Fisher
Attorney Patented Oct. 20, 1942

2,299,404

UNITED STATES PATENT OFFICE 2,299,404

AUTOMATICALLY OPERATED VALVE

Alwin B. Newton, Minneapolis, Minn., assignor to Minneapolis-Honeywell Regulator Company, Minneapolis, Minn., a corporation of Delaware Application October 28, 1939, Serial No. 301,858

14 Claims. (Cl. 137—139)

This invention relates to an automatically operated valve and while it is of general application it is particularly useful in the system disclosed in application Serial No. 243,808 filed by William L. McGrath on December 3, 1938, and now Patent No. 2,237,261, granted April 1, 1941.

In the aforementioned McGrath application a solenoid valve located in the suction line from an evaporator is controlled by a relay having a maintaining switch which in turn is controlled by a thermostat responsive to the temperature being controlled and by a switching means responsive to the pressure in the evaporator. The arrangement is such that the solenoid valve is opened only when the thermostat is calling for cooling and the evaporator pressure has risen to a defrosting value and is closed when either the thermostat becomes satisfied or the evaporator pressure decreases to a predetermined low value.

The prime objct of this invention is to provide a unitary control arrangement for accomplishing this sequence of operation and for accomplishing it with a fewer number of parts. In carrying out this invention, the relay is entirely eliminated and the evaporator pressure responsive switching means as well as the maintaining switch are included in the solenoid valve. The pressure responsive device in addition to operating the switching means also serves as a seal off for the solenoid valve.

Further objects of this invention will become apparent to those skilled in the art upon reference to the accompanying specification, claims and drawing in which is diagramatically illustrated the preferred form of this invention.

For purposes of illustration the automatically operated valve is shown for use in a multiple fixture refrigerating apparatus of the type disclosed in the aforementioned McGrath application. Two fixtures are designated at 10 and 11 and these fixtures are cooled by evaporators 12 and 13, respectively. The evaporators 12 and 13 are arranged in parallel and refrigerant is circulated through these evaporators by a refrigerating apparatus generally designated at 14. The refrigerating apparatus is in turn controlled by a combination suction pressure and head pressure switching mechanism generally designated at 15. The valve of this invention is generally designated at 16 and is located in the suction line leading from the evaporator 12, this valve being controlled by the pressure in the evaporator 12 as well as by a thermostat generally designated at 17 responsive to the temperature in the fixture 10. A similar valve generally designated at 18 is located in the suction line leading from the evaporator 13 and this valve in addition to being controlled by the pressure in the evaporator 13 is also controlled by a thermostat generally designated at 19 responsive to the temperature in the fixture 11.

The refrigerating apparatus 14 may comprise a compressor 21 operated by an electric motor 22. Compressed refrigerant passes from the compressor 21 through a high pressure line 23 to a condenser 24. The condensed refrigerant is collected in a receiver 25 and flows through a liquid line 26 to the evaporator 12. Evaporated refrigerant is withdrawn from the evaporator 12 through a suction line 27 by the compressor 21 and as pointed out above the valve 16 is interposed in the suction line 27 leading from the evaporator 12. The flow of refrigerant to the evaporator 12 is controlled by a conventional thermostatic expansion valve 28 having a bulb 29 responding to the temperature of the refrigerant leaving the evaporator 12. Liquid refrigerant is also supplied through a branch liquid line 26' to the evaporator 13 of the fixture 11 and evaporated refrigerant is withdrawn from the evaporator 13 through a branch suction line 27'. As pointed out above the valve 18 is included in the branch suction line 27. The supply of refrigerant to the evaporator 13 may also be controlled by a thermostatic expansion valve 28' having a bulb 29' responsive to the temperature of the refrigerant leaving the evaporator 13.

The combined suction pressure and head pressure responsive controller 15 may be of the type shown in application Serial No. 196,447 filed by Albert L. Judson and Carl G. Kronmiller on March 17, 1938, and now Patent No. 2,244,783, granted June 10, 1941. This controller is connected by a pipe 31 to the suction pressure line 27 and is connected by a pipe 32 to the condenser 24 so that it is operated in response to changes in suction pressure and head pressure. Power is supplied to the compressor motor 22 by means of line wires 33 and 34 leading from some source of power not shown. When the suction pressure increases to a predetermined high value and the head pressure decreases to a predetermined low value a circuit is completed from the line wire 33 through wire 35, controller 15, wire 36, compressor motor 22 and wire 37 back to the other line wire 34 to cause operation of the compressor 21. When either the suction pressure decreases to a predetermined low value or the head pressure increases to a predetermined high value this circuit to the compressor motor 22 is broken to stop operation of the compressor 21. Thus the suction pressure is maintained within predetermined limits.

The automatically operated valve 16 may comprise a valve casing 40 separated by a partition 41 to form an inlet chamber 42 and an outlet chamber 43. Located in the partition 41 is a valve seat 44 which is opened and closed by a valve element 45. The valve element 45 is connected to a valve stem 46 provided with a lower abutment 47 and an upper abutment 48. Slidably mounted on the stem 46 between the abutments 47 and 48 is an armature 49 formed of magnetic material. When the armature 49 is raised it engages the upper abutment 48 to lift the valve element 45 off of the seat 44 with a hammer action and when the armature 49 is allowed to lower it engages the lower abutment 47 to move the valve element 45 against the seat 44 with a hammer action.

Screw threadedly mounted on the valve casing 40 is a member 51 to which is soldered or otherwise suitably secured a sleeve 52 formed of non-magnetic material. The armature 49 moves longitudinally within the sleeve 52. A stop 50 suitably secured in the sleeve 52 limits the upward movement of the armature 49. Mounted around the sleeve 52 and formed of magnetic material is a collar 53 and resting on this collar 53 and also surrounding the sleeve 52 is an electrical operating coil 54. The collar 53 and the operating coil 54 are held in place by a casing 55 also made of magnetic material, the casing 55 being screw threaded on the member 51 and also being provided with an inturned flange 56 for holding the operating coil 54 in place. Mounted on the flange 56 is a bracket 57 to which is pivotally mounted an armature 58 formed of magnetic material. The armature 58 surrounds the sleeve 52 and is provided with a contact 59 which is adapted to engage a stationary contact 60. When the operating coil 54 is energized a magnetic circuit is completed from the armature 49 through collar 53, casing 55, inturned flange 56 and armature 58 back to the armature 49 to raise the armature 49 in the sleeve 52 for opening the valve and to move the armature 58 downwardly to cause movement of contact 59 into engagement with contact 60. When the operating coil is deenergized the magnetic circuit is interrupted, the armature 49 is moved downwardly by gravity to close the valve and the armature 58 is moved upwardly by means of a spring, not shown.

Soldered or otherwise suitably secured to the sleeve 52 is a bellows 61 having a movable wall 62 and this bellows seals off the sleeve 52 so that refrigerant can not escape therefrom. The bellows 61 is influenced by the pressure on the upstream side of the valve and hence the pressure in the evaporator 12 and the bellows 61 in accordance with this pressure operates a plunger 63 for in turn operating a lever 64 pivoted at one end to the bracket 57. The lever 64 is urged in the opposite direction by an adjustable tension spring 65. One end of the tension spring 65 is connected to a lug 66 struck upwardly from the casing 55 and the other end is secured to an adjusting screw arrangement 67. By suitably adjusting the tension in the spring 65 the pressure values at which the lever 64 is operated may be varied. A cup member 68 is suitably secured to the sleeve 52 for limiting the upward movement of the bellows 61 to prevent rupture of the same.

A contact member 70 is carried by an insulating pad which in turn is carried by the lever 64 and this contact member 70 is adapted to engage contacts carried by a contact member 71 and a contact member 72. The contact members 71 and 72 are carried by leaf springs 73 which are in turn insulatingly secured to the bracket 57. The leaf springs 73 urge the contact members 71 and 72 into engagement with concentrically mounted and independently rotated cams 74 and 75. By suitably rotating the cams 74 and 75 contact members 71 and 72 may be independently adjusted with respect to the contact member 70. For purposes of illustration it is assumed that when the pressure within the evaporator 12 increases to 15 pounds the contact member 70 engages the contact member 71 and when the pressure increases to 35 pounds the contact member 70 engages the contact member 72. Conversely when the pressure decreases to 35 pounds the contact member 70 disengages the contact member 72 and when the pressure decreases to 15 pounds the contact member 70 disengages the contact member 71. The concentrically located cams 74 and 75 are carried by a suitable bracket 76.

The thermostat 17 within the fixture 10 may comprise a bellows 80 charged with a volatile fluid for operating a lever 81 against the action of an adjustable tension spring 82. The lever 81 in turn operates a mercury switch 83 and for purposes of illustration it is assumed that when the temperature within the fixture 10 rises to 40° the mercury switch is closed and when the temperature decreases to 38° the mercury switch is opened.

With the parts in the positions shown in the drawing the temperature within the fixture 10 is below 40° and the pressure in the evaporator 12 is below 15 pounds. Assume now that the temperature within the fixture 10 rises to 40° to close the mercury switch 83 and that the pressure within the evaporator 12 following defrosting thereof rises to 35 pounds to move the contact member 70 into engagement with the contact members 71 and 72. This completes a starting circuit from the line wire 33 through wires 85 and 86, mercury switch 83, wire 87, contact member 70, contact member 72, wire 88, operating coil 54 and wires 89 and 90 back to the other line wire 34. Completion of this circuit energizes the operating coil 54 to complete the above mentioned magnetic circuit which opens the valve 45 and which moves the contact 59 into engagement with the contact 60. Thus the evaporator 12 is placed in communication with the suction side of the compressor 21 after the evaporator 12 has defrosted.

Movement of the contact 59 into engagement with the contact 60 completes a maintaining circuit which may be traced from the line wire 33 through wires 85 and 86, mercury switch 83, wire 87, contact member 71, contact member 70, wire 92, contacts 59 and 60, wire 93, operating coil 54, and wires 89 and 90 back to the other line wire 34. Completion of this circuit maintains the operating coil 54 energized and hence the valve 45 open until either the temperature within the fixture 10 decreases to 38° to open the mercury switch 83 or until the pressure within the evaporator 12 decreases to 15 pounds to move the contact member 70 out of engagement with the contact member 71. When either of these contingencies occur the operating coil 54 is deenergized to close the valve 45 and the operating coil cannot again be reenergized until both the temperature within the fixture rises to 40° and the pressure in the evaporator 12 rises to 35 pounds following defrosting of the same.

The thermostat 19 in the fixture 11 is identical to the thermostat 17 in the fixture 10 and it controls the operation of the valve 18 in exactly the same manner that the thermostat 17 controls the operation of the valve 16. Accordingly like reference characters primed have been utilized for like parts.

Thus it will be seen that the automatically operated valve of this invention may be utilized for controlling independently a plurality of evaporators intermittently to defrost the same. The automatically operated valve is compact in construction and incorporates in a unitary arrangement the various parts for performing the sequence of operation that is obtained in the aforementioned McGrath application.

Although one form of this invention has been disclosed for purposes of illustration other forms thereof may become apparent to those skilled in the art upon reference to this disclosure and therefore this invention is to be limited only by the scope of the appended claims.

I claim as my invention:

1. In combination, a valve for controlling the flow of a fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for moving the armature, a movable wall for sealing the sleeve to prevent the escape of fluid therefrom and movable in accordance with the pressure of the fluid being controlled, and switching means operated by said movable wall.

2. In combination, a valve for controlling the flow of a fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for moving the armature, a movable wall for sealing the sleeve to prevent the escape of fluid therefrom and movable in accordance with the pressure of the fluid being controlled, switching means operated by said movable wall, and connections between the switching means and the electrical operating coil for controlling the energization of the latter.

3. In combination, a valve for controlling the flow of a fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for moving the armature, a movable wall for sealing the sleeve to prevent the escape of fluid therefrom and movable in accordance with the pressure of the fluid being controlled, switching means operated by said movable wall, other switching means, and connections between both switching means and the electrical operating coil for controlling the energization of the latter.

4. In combination, a valve for controlling the flow of a fluid and including a valve seat and a movable valve cooperating therewith, an armature for moving the valve element, a sleeve within which said armature moves, the interior of said sleeve being in communication with the fluid on the upstream side of the valve, an electrical operating coil exterior of the sleeve for moving the armature, a movable wall for sealing the sleeve to prevent the escape of fluid therefrom and movable in accordance with the pressure of the fluid on the upstream side of the valve, and switching means operated by said movable wall.

5. In combination, a valve for controlling the flow of a fluid and including a valve seat and a movable valve cooperating therewith, an armature for moving the valve element, a sleeve within which said armature moves, the interior of said sleeve being in communication with the fluid on the upstream side of the valve, an electrical operating coil exterior of the sleeve for moving the armature, a movable wall for sealing the sleeve to prevent the escape of fluid therefrom and movable in accordance with the pressure of the fluid on the upstream side of the valve, switching means operated by said movable wall, and connections between the switching means and the electrical operating coil for controlling the energization of the latter in accordance with the pressure of the fluid on the upstream side of the valve.

6. In combination, a valve for controlling the flow of a fluid and including a valve seat and a movable valve cooperating therewith, an armature for moving the valve element, a sleeve within which said armature moves, the interior of said sleeve being in communication with the fluid on the upstream side of the valve, an electrical operating coil exterior of the sleeve for moving the armature, a movable wall for sealing the sleeve to prevent the escape of fluid therefrom and movable in accordance with the pressure of the fluid on the upstream side of the valve, switching means operated by said movable wall, other switching means, and connections between both switching means and the electrical operating coil for controlling the energization of the latter in accordance with the operation of said other switching means and the pressure of the fluid on the upstream side of the valve.

7. In combination, a valve for controlling the flow of a fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid being controlled, switching means operated by said movable wall, and connections between the switching means, the switch and the electrical operating coil for controlling the energization of the latter.

8. In combination, a valve for controlling the flow of a fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid being controlled, a pair of switches sequentially opened and closed by said movable wall, connections between the second to close of the sequentially operated switches and the operating coil for energizing the latter, and connections between the first to close of the sequentially operated switches, the switch operated by the second armature and the electrical operating coil for maintaining the latter energized.

9. In combination, a valve for controlling the flow of a fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid being controlled, a switch operated by said movable wall, a remotely located switch, connections between the remotely located switch, the switch operated by the movable wall and the electrical operating coil for energizing the latter, and connections between the remotely located switch, the switch operated by the second armature and the electrical operating coil for maintaining the latter energized.

10. In combination, a valve for controlling the flow of fluid and including a valve seat and a movable valve element cooperating therewith, an armature for moving the valve element, a sleeve within which said armature moves, the interior of said sleeve being in communication with the fluid being controlled, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid being controlled, a pair of switches sequentially opened and closed by the movable wall, a remotely located switch, connections between the remotely located switch, the second to close of the sequentially operated switches and the electrical operating coil for energizing the latter, and connections between the remotely located switch, the first to close of the sequentially operated switches, the switch operated by the second armature and the electrical operaing coil for maintaining the latter energized.

11. In combination, a valve for controlling the flow of a fluid and including a valve seat and a movable valve element cooperating therewith, an armature for moving the valve element, a sleeve within which said armature moves, the interior of said sleeve being in communication with the fluid on the upstream side of the valve, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid on the upstream side of the valve, switching means operated by said movable wall and connections between the switching means, the switch and the electrical operating means for controlling the energization of the latter in accordance with the pressure on the upstream side of the valve.

12. In combination, a valve for controlling the flow of a fluid and including a valve seat and a movable valve element cooperating therewith, an armature for moving the valve element, a sleeve within which said armature moves, the interior of said sleeve being in communication with the fluid on the upstream side of the valve, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid on the upstream side of the valve, a pair of switches operated by said movable wall and sequentially closed upon a pressure increase and sequentially opened upon a pressure decrease, connections between the second to close of the sequentially operated switches and the electrical operating coil for energizing the latter when the pressure increases to a predetermined high value, and connections between the first to close of the sequentially operated switches, the switch operated by the second armature and the electrical operating coil for maintaining the latter energized until the pressure decreases to a predetermined low value.

13. In combination, a valve for controlling the flow of a fluid and including a valve seat and a movable valve element cooperating therewith, an armature for moving the valve element, a sleeve within which said armature moves, the interior of said sleeve being in communication with the fluid on the upstream side of the valve, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid on the upstream side of the valve, a switch closed by the movable wall when the pressure increases to a predetermined value, a remotely located switch, connections between the remotely located switch, the switch operated by the movable wall and the electrical operating coil for energizing the latter when the pressure increases to the predetermined value, and connections between the remotely located switch, the switch operated by the second armature and the electrical operating coil for maintaining the latter energized.

14. In combination, a valve for controlling the flow of a fluid and including a valve seat and a movable valve element cooperating therewith, an armature for moving the valve element, a sleeve within which said armature moves, the interior of said sleeve being in communication with the fluid on the upstream side of the valve, an electrical operating coil exterior of the sleeve for energizing a magnetic circuit upon energization thereof for moving the armature, a switch, a second armature included in said magnetic circuit for closing the switch when the electrical operating coil is energized, a movable wall for sealing the sleeve to prevent the escape of fluid therefrom and movable in accordance with the pressure of the fluid on the upstream side of the valve, a pair of switches operated by said movable wall and sequentially closed upon a pressure increase and sequentially opened upon a pressure decrease, a remotely located switch, connections between the remotely located switch, the second to close of the sequentially operated switches and the electrical operating coil for energizing the latter when the pressure increases to a predetermined high value, and connections between the remotely located switch, the first to close of the sequentially operated switches, the switch operated by the second armature and the electrical operating coil to maintain the latter energized until either the pressure decreases to a predetermined low value or the remotely located switch is opened.

ALWIN B. NEWTON.